United States Patent
Peachey et al.

(10) Patent No.: US 11,846,374 B2
(45) Date of Patent: Dec. 19, 2023

(54) PIPE JOINT WITH CONDUCTIVE SEAL

(71) Applicant: AIRBUS OPERATIONS LIMITED, Bristol (GB)

(72) Inventors: Daniel Peachey, Bristol (GB); Anthony Bryant, Bristol (GB); Eric Bonte, Bristol (GB); Sergio Campos Diez, Bristol (GB)

(73) Assignee: Airbus Operations Limited, Bristol (GB)

( * ) Notice: Subject to any disclaimer, the term of this patent is extended or adjusted under 35 U.S.C. 154(b) by 338 days.

(21) Appl. No.: 17/286,265

(22) PCT Filed: Oct. 17, 2019

(86) PCT No.: PCT/EP2019/078191
§ 371 (c)(1),
(2) Date: Apr. 16, 2021

(87) PCT Pub. No.: WO2020/079135
PCT Pub. Date: Apr. 23, 2020

(65) Prior Publication Data
US 2021/0388924 A1   Dec. 16, 2021

(30) Foreign Application Priority Data
Oct. 19, 2018   (GB) ...................... 1817095

(51) Int. Cl.
*F16L 25/01*   (2006.01)
*B64D 37/00*   (2006.01)
(Continued)

(52) U.S. Cl.
CPC ............ *F16L 25/01* (2013.01); *B64D 37/005* (2013.01); *B64D 45/02* (2013.01); *F16L 21/035* (2013.01)

(58) Field of Classification Search
CPC ......... F16L 21/03; F16L 21/035; F16L 25/01; F16L 27/125; F16L 27/026
See application file for complete search history.

(56) References Cited

U.S. PATENT DOCUMENTS 2,953,398 A   9/1960   Haugen et al.
3,041,077 A   6/1962   Osterloh et al.
(Continued)

FOREIGN PATENT DOCUMENTS

| CH | 677395 | 5/1991 |
| GB | 824833 | 12/1959 |
| GB | 2 327 477 | 1/1999 |

OTHER PUBLICATIONS

International Search Report for PCT/EP2019/078191, dated Jan. 9, 2020, 4 pages.
(Continued)

*Primary Examiner* — Aaron M Dunwoody
(74) *Attorney, Agent, or Firm* — Nixon & Vanderhye P.C.

(57) ABSTRACT

A pipe joint with a socket, and a pipe fitted into the socket. An annular seal is compressed between the socket and the pipe. The seal is electrically conductive and resiliently flexible. The socket or the pipe has a recess which houses the seal. The recess has a ridge in a base of the recess and the seal has a groove which extends around a radial periphery of the seal. The ridge fits into the groove to fool proof the installation, such that a standard non-conductive O-ring seal is more difficult to install in error.

19 Claims, 9 Drawing Sheets

(51) Int. Cl.
    *B64D 45/02*    (2006.01)
    *F16L 21/035*    (2006.01)

(56) References Cited

U.S. PATENT DOCUMENTS

| | | |
|---|---|---|
| 5,067,751 A | 11/1991 | Walworth et al. |
| 9,109,701 B1 | 8/2015 | Copeland |
| 9,739,402 B2 | 8/2017 | Flynn et al. |
| 2008/0078880 A1 | 4/2008 | Petit |
| 2010/0044972 A1* | 2/2010 | Vila ............... F16L 27/026 |
| | | 285/302 |
| 2015/0176732 A1 | 6/2015 | Courpet et al. |
| 2017/0198855 A1 | 7/2017 | Baach et al. |

OTHER PUBLICATIONS

Combined Search and Exam Report for GB1817095.1, dated Apr. 17, 2019, 9 pages.
Hatchett, David W et al, Composites of Intrinsically Conducting Polymers as a Sensing Nanomaterial, Chemical Review, 2008, vol. 108, pp. 746-769.

* cited by examiner

PIPE JOINT WITH CONDUCTIVE SEAL

This application is the U.S. national phase of International Application PCT/EP2019/078191 filed Oct. 17, 2019, which designated the U.S. and claims priority to United Kingdom Patent Application GB 1817095.1 filed Oct. 19, 2018, the entire contents of each of which are hereby incorporated by reference.

FIELD OF THE INVENTION

The present invention relates to a pipe joint with an electrically conductive seal.

BACKGROUND OF THE INVENTION

An electrically conductive annular seal for use in a fluid conveyance system is described in U.S. Pat. No. 9,739,402. The seal includes a center core having a generally tubular shape, the core having a circumferentially projected cross-section that is defined by inner and outer core radial surfaces, and core axial surfaces that are opposite one another. The sidewalls each have a generally tubular shape and a circumferentially projected cross-section that is defined by inner and outer sidewall radial surfaces, and first and second sidewall axial surfaces that are opposite one another. The first sidewall is attached along one of its axial surfaces to one of the core axial surfaces, and the second sidewall is attached along one of its axial surfaces to the other of the core axial surfaces. The center core has an electrical resistance that is less than an electrical resistance of each of the first and second sidewalls.

In one example an outer arced profile of the seal is outwardly concave as opposed to outwardly convex. The projected profiles of the seal can in fact take on any profile or shape, so long as they provide the sealing that is required when positioned and compressed within the slots that form the seal. In such fashion, a unique profile can be selected to uniquely identify the seal for its use. For instance, an air handling unit may have a unique design for its system, and a fuel line may have another unique design for its system. Each system may have a profile dedicated thereto and even including different diameter seals, or each seal itself may have a specific and unique profile. Thus, confusion may be avoided for technicians or maintenance personnel, such that an O-ring, for instance, may not be inadvertently used during a maintenance event.

SUMMARY OF THE INVENTION

According to a first aspect of the invention, there is provided a pipe joint comprising a socket; a pipe fitted into the socket; and a seal compressed between the socket and the pipe, wherein the seal is electrically conductive and resiliently flexible, the socket or the pipe has a recess which houses the seal, the recess has a ridge in a base of the recess, the seal has a groove which extends around a radial periphery of the seal, and the ridge fits into the groove.

The pipe joint has a fool proof design such that an equivalently-sized standard non-conductive O-ring seal is more difficult to install. The mismatch between the ridge and the convex radial periphery of the O-ring causes the O-ring to protrude out of the recess to the extent that it cannot compress sufficiently when an attempt is made to push the pipe into the socket.

In some embodiments the pipe has the recess and the groove extends around an inner radial periphery of the seal.

In other embodiments the socket has the recess and the groove extends around an outer radial periphery of the seal.

Preferably the recess comprises a pair of side walls; and the base of the recess has a pair of channels between the ridge and the side walls.

A second aspect of the invention provides pipe joint comprising a first pipe with a socket; a second pipe fitted into the socket; and a seal between the first and second pipes, wherein the seal is electrically conductive so that it permits electrical currents to flow between the first and second pipes via the seal member, the seal is resiliently flexible so that it provides a liquid-tight seal between the first and second pipes, the seal has a groove which runs around an inner radial periphery of the seal member, and the second pipe has a ridge which runs around an outer radial periphery of the second pipe and fits into the groove in the inner radial periphery of the seal.

The following comments apply to both aspects of the invention.

In some embodiments the groove and/or the ridge has a transverse cross-section which is curved over a majority of a width of the groove and/or the ridge. This minimises stress concentration compared with a groove or ridge with straight walls and sharp corners. Most preferably the transverse cross-section of the groove and/or the ridge has a substantially constant radius of curvature over at least a majority of a width of the groove and/or the ridge.

In another embodiment the ridge has a pair of side walls which extend at right angles to an axis of the pipe joint. This impedes the seal being pushed sideways by axial forces.

Preferably the ridge and the groove have complementary shapes so that they are in contact over at least a majority of their respective widths.

Preferably the ridge and the groove have complementary partially-toroidal shapes.

The seal provides a conductive path between the socket and the pipe. Typically the seal provides a conductive path between the socket and the pipe with an electrical resistance less than 3 M Ohm, preferably less than 1 M Ohm, and most preferably less than 500 k Ohm, or less than 200 k Ohm, or less than 100 k Ohm, or less than 100 Ohm.

Typically the seal provides a conductive path between the socket and the pipe with an electrical resistance greater than 1 Ohm or greater than 50 Ohm or greater than 1 k Ohm.

By way of example the seal may provide a conductive path between the socket and the pipe with an electrical resistance greater than 1 Ohm and less than 200 k Ohm.

Preferably the seal comprises a seal material (such an elastomeric or thermoplastic material) mixed with a fill material, and the fill material has a higher electrical conductivity than the seal material. Preferably, the fill material is a particulate fill material.

The fill material may be carbon (such as carbon black or carbon nanotubes); a metal such as nickel or silver; or any other electrically conductive material.

Preferably the seal material is an elastomeric material.

Optionally the seal material is a single homogenous seal material.

The pipe may be a fuel pipe, an inert gas pipe, a hydraulic pipe, a water pipe, a waste pipe or a pipe for conveying any other type of liquid or gas.

Preferably the seal is compressed between the socket and the pipe with a compression ratio greater than 10%.

Preferably the seal and/or the ridge has a plane of symmetry which bisects the groove and/or the ridge.

Preferably the seal has a thickness, the groove has a width, and the width of the groove is more than 50% of the thickness of the seal. Providing such a relatively wide groove enables the ridge and the groove to be fitted together easily.

Preferably the groove and/or the ridge has a transverse cross-section with a width and a depth, and the width of the transverse cross-section is more than twice the depth of the transverse cross-section. Providing such a relatively wide groove enables the ridge and the groove to be fitted together easily.

Preferably the pipe joint is a flexible joint which permits relative movement between the pipe and the socket.

Optionally the pipe joint has a joint axis, and the flexible joint permits an axial relative movement between the pipe and the socket in an axial direction parallel with the joint axis. This axial relative movement typically has a permitted range which is greater than 1 mm and most preferably greater than 10 mm.

Optionally the flexible joint permits a pivoting relative movement between the pipe and the socket in which a pipe axis of the pipe pivots relative to a socket axis of the socket (or vice versa). This pivoting relative movement typically has a permitted range which is greater than 1° and most preferably greater than 2°.

Optionally the seal has a pair of lobes which extend around a radial periphery of the seal opposite the groove, wherein the lobes contact the pipe or the socket at two separate contact regions. The separate (i.e. non-contiguous) contact regions provide an improved sealing performance.

Optionally the recess has a pair of side walls which are the inner faces of a pair of annular flanges. The annular flanges may have end walls which are inclined in opposite directions.

In one embodiment the seal has a groove which extends around an inner radial periphery of the seal, a groove which extends around an outer radial periphery of the seal, a first groove which extends around a first axial periphery of the seal, and a second groove which extends around a second axial periphery of the seal. Such an X-shaped profile can provide an improved sealing performance because pressure acting on the first or second groove tends to improve the performance of the seal.

A further aspect of the invention provides an aircraft comprising a pipe joint according to the first or second aspect. Alternatively the pipe joint may be part of another vehicle, or a fixed (non-vehicle) installation.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
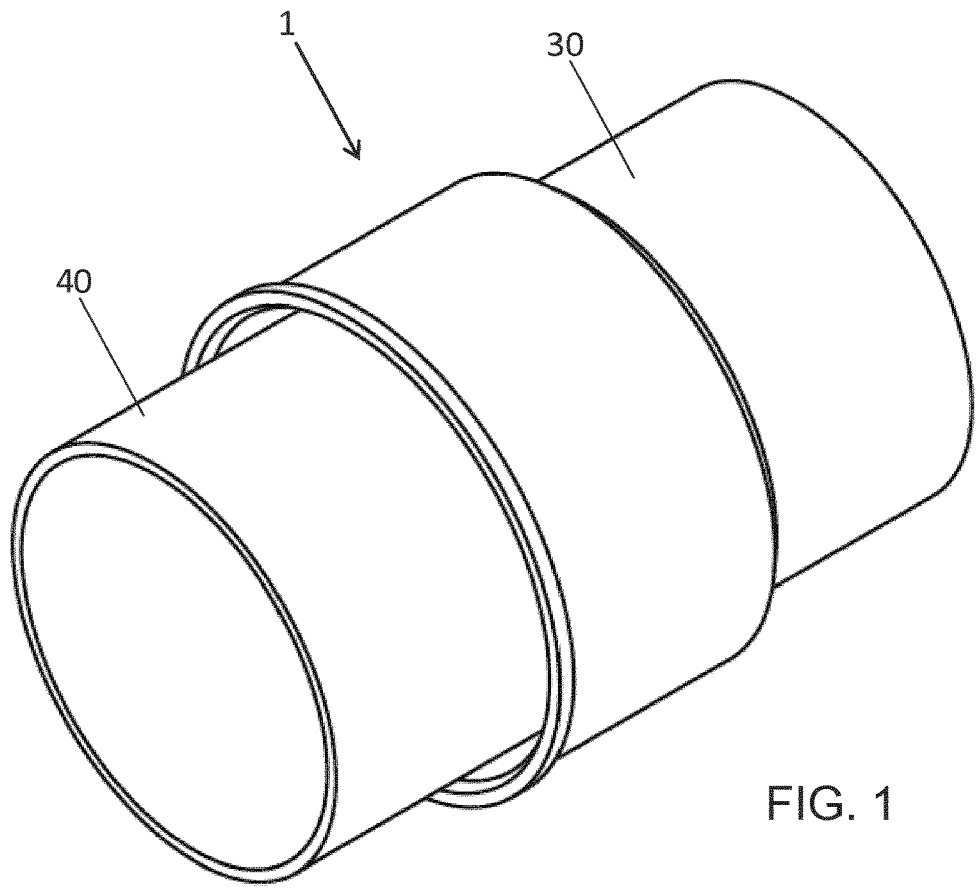
FIG. 1 is an isometric view of a pipe joint.
Figure 2:
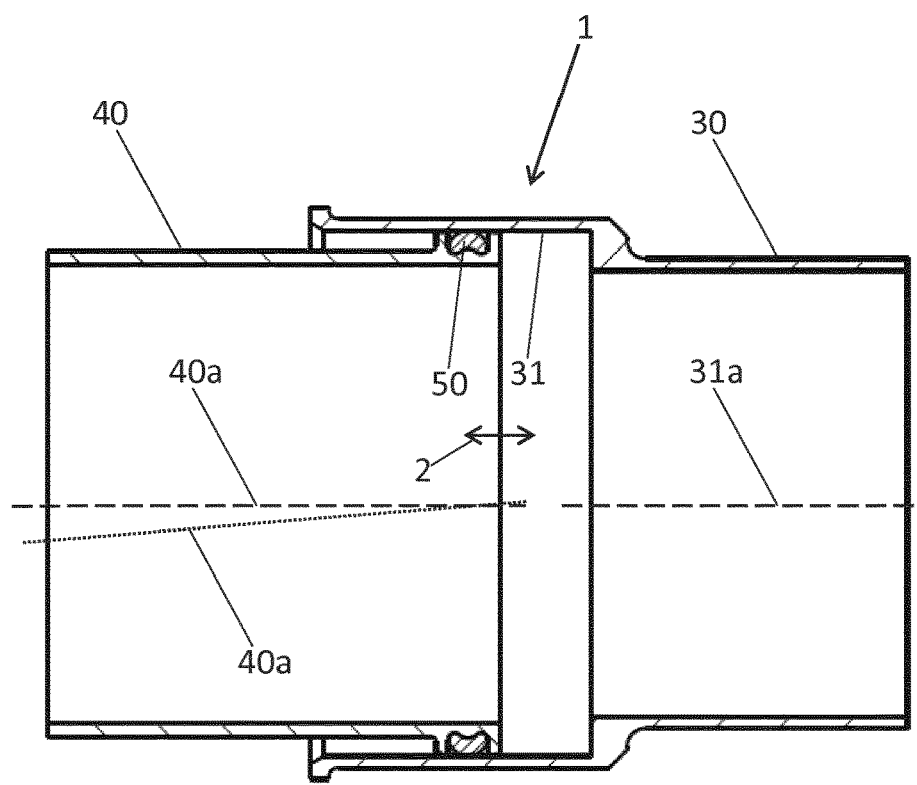
FIG. 2 is a cross-sectional view along the length of the joint and transverse to the seal.
Figure 3:
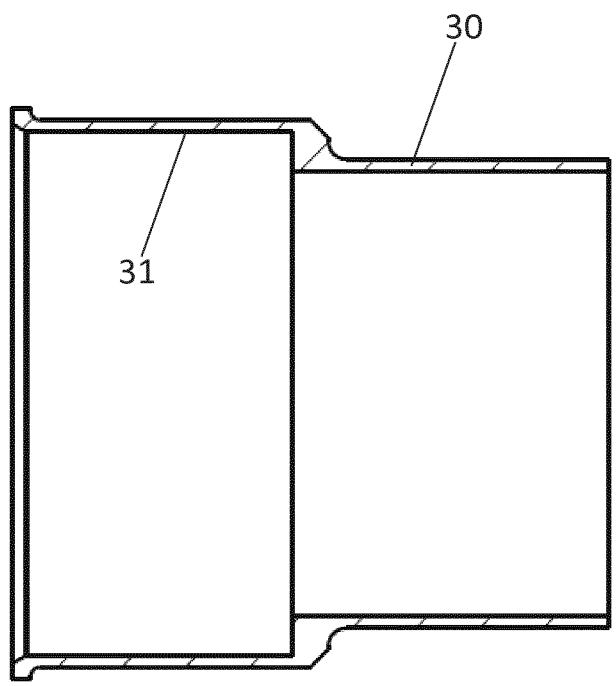
FIG. 3 is a cross-sectional view of the first pipe with the socket.
Figure 4:
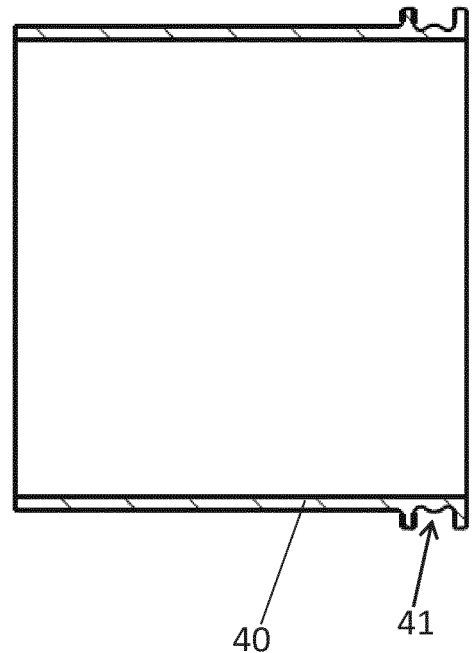
FIG. 4 is a cross-sectional view of the second pipe which forms the male part of the joint and carries the seal.
Figure 5:
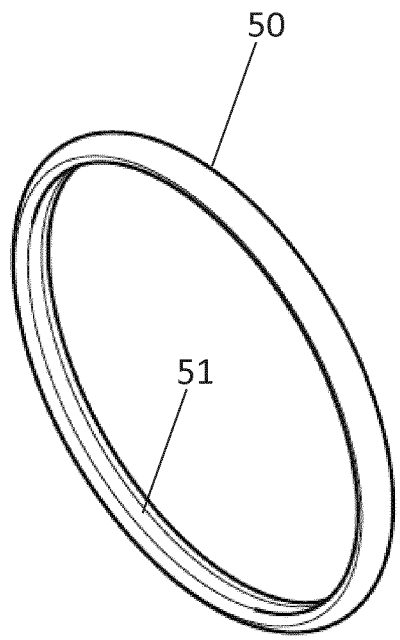
FIG. 5 is an isometric view of the seal.
Figure 6:
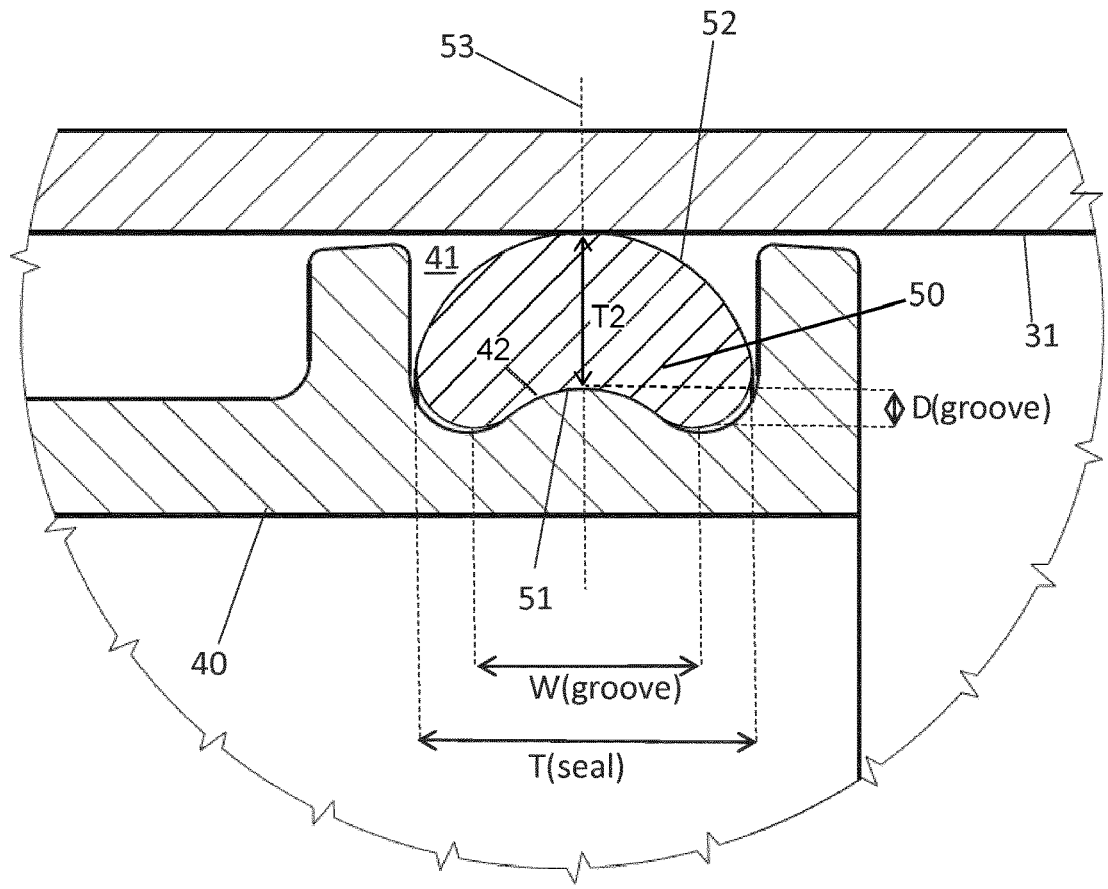
FIG. 6 is an enlarged cross-sectional view of the seal.

A pipe joint 1 shown in FIGS. 1 and 2 comprises a first fuel pipe 30 shown individually in FIG. 3 with an enlarged end providing a socket 31; a second fuel pipe 40 shown individually in FIG. 4 fitted into the socket 31; and an annular seal or gasket 50 shown individually in FIG. 5. The seal 50 is compressed between the socket and the pipe as shown in FIGS. 2 and 6. Each fuel pipe 30, 40 may have any length, and one or both of the fuel pipes may be a short fitting which is fitted to a further longer section of fuel pipe. The joint 1 is designed to enable relative axial movement of the pipes of up to 15 mm, and relative angular movement of up to 4°.

More specifically; the pipe joint is a flexible joint with a joint axis, and the flexible joint permits an axial relative movement 2 between the pipe 40 and the socket 31 in an axial direction parallel with the joint axis. This axial relative movement typically has a permitted range which is greater than 1 mm and most preferably greater than 10 mm.

The flexible joint also permits a pivoting relative movement between the pipe 40 and the socket 31 in which a pipe axis 40a of the pipe 40 pivots relative to a socket axis 31a of the socket 31 (or vice versa). This pivoting relative movement typically has a permitted range which is greater than 1° and most preferably greater than 2°. By way of example, the pipe axis 40a is shown in dotted lines in FIG. 2 following such a pivoting movement (the angle is exaggerated in the drawing).

Figure 7:
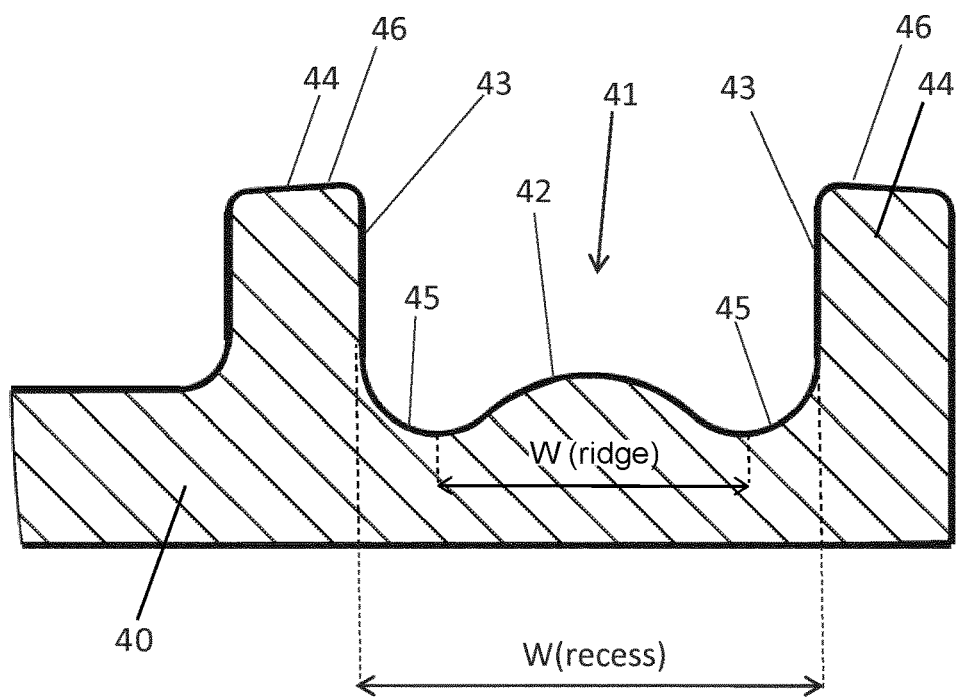
FIG. 7 is an enlarged cross-sectional view of the seal housing in the second pipe.

The second pipe 40 has a recess 41 (shown in FIG. 7) on its outer radial periphery which houses the seal 50 as shown in FIG. 6. The recess 41 has a base with a ridge or baulk 42 in the base which extends around a full circumference of the recess. As shown in FIG. 7, the recess 41 also has a pair of side walls 43 which are the inner faces of a pair of annular flanges 44. The base of the recess 41 also has a pair of channels 45 between the ridge 42 and the side walls 43. The flanges 44 have end walls 46 which are inclined in opposite directions to enable the pivoting movement described above.

The seal 50 has a groove or scallop 51 which extends around an inner radial periphery of the seal. The ridge 42 fits into the groove 51 as shown most clearly in FIG. 6.

The seal 50 is electrically conductive and resiliently flexible, and formed from a single homogenous seal material. The seal material comprises an elastomeric material mixed with a fill material. The fill material has a higher electrical conductivity than the elastomeric material. The elastomeric material may be, for example a fluorosilicone, nitrile or Viton™. A variety of fill materials may be used, including carbon (for instance carbon black or carbon nanotubes) or metallic fill materials such as silver or nickel. The elastomeric material makes the seal resiliently flexible, and the fill material makes it electrically conductive. Preferably, the fill material is a particulate fill material. In another embodiment the seal material comprises a thermoplastic material.

The seal 50 is electrically conductive so that it permits electrical currents to flow between the first and second fuel pipes via the seal. Such current flow may be required to dissipate electro-static charges, or transmit energy from high voltage events such as lightning strikes at a safe level of current. To this end the seal 50 provides a conductive path between the socket 31 and the second pipe 40 with an electrical resistance which is preferably less than 100 kilo-ohm.

In one embodiment the first and second pipes are made of an electrically resistive material so that each pipe has a resistance of the order of 100 kilo-ohm. In this case, the electrical resistance of the seal is as low as possible, and optionally could be as low as 6 Ohm. This requires a large amount of fill material to be mixed into the elastomeric material, so care needs to be taken that the sealing performance of the seal is not compromised too much.

In another embodiment the first and second pipes are made of metal so that each pipe has a very low resistance, for instance below 1 Ohm. In this case, the electrical resistance of the seal is preferably of the order of 100 kilo-ohm.

Figure 8:
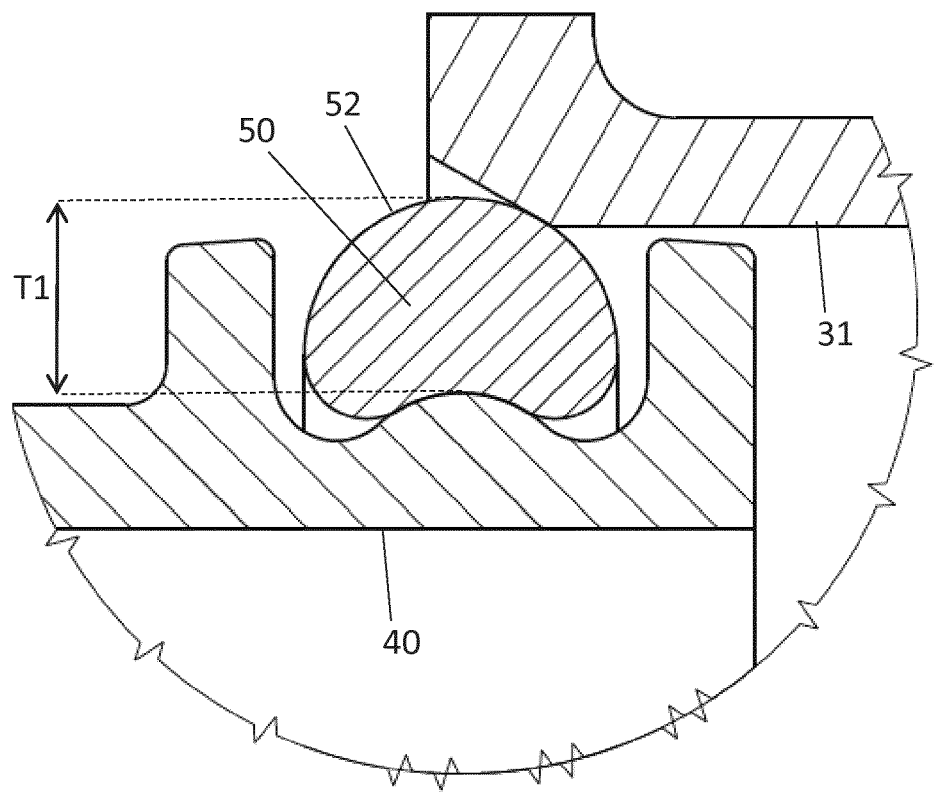
FIG. 8 shows the seal in its uncompressed state before the pipe joint is assembled.

The seal 50 is compressed between the first and second fuel pipes so that it provides a liquid-tight seal between them. Prior to assembly of the joint, the seal 50 is stretched over the flange 44 then springs back into the recess as shown in FIG. 8. At this stage the seal 50 is slightly stretched circumferentially. The pipe 40 is then pushed into the socket 31 which causes the seal 50 to become compressed as shown in FIG. 6 between the socket and the pipe with a compression ratio greater than 10%. So its compressed radial thickness T2 shown in FIG. 6 is more than 10% less than its uncompressed radial thickness T1 shown in FIG. 8.

The ridge 42 and the groove 51 have complementary convex and concave curved shapes, when viewed in transverse cross-section as in FIGS. 6 and 8, so that they are in intimate contact over a majority of their respective widths when the seal is in its uncompressed state (FIG. 8) as well as its compressed state (FIG. 6).

The groove 51 has a transverse cross-section with a width W(groove) and a depth D(groove) as shown in FIG. 6. The width W(groove) is more than the depth D(groove)—in other words the groove 51 is relatively shallow compared to its width. In this case the width W(groove) is about six times the depth D(groove). The same is true of the ridge 42 which has a width W(ridge) about six times its depth.

The seal has an axial seal thickness T(seal) and the width W(groove) is more than 40% of the axial seal thickness T(seal). In this case the width W(groove) is about 60-70% of the axial seal thickness T(seal).

The width W(ridge) of the ridge is more than 40% of the width W(recess) of the recess between its walls 43. In this case the width W(ridge) is about 60-70% of the width W(recess).

The groove 51 has a concave transverse cross-section which is continuously curved over the full width of the groove. The transverse cross-section of the groove 51 has a substantially constant radius of curvature over a majority of a width of the groove so that it has a concave partially toroidal profile where the radius is constant.

The same is true of the ridge 42—which has a convex transverse cross-section which is continuously curved over the full width of the ridge. The transverse cross-section of the ridge has a substantially constant radius of curvature over a majority of a width of the ridge so that it has a convex partially toroidal profile where the radius is constant.

The complementary partially-toroidal shapes of the groove and the ridge ensure that they are in intimate contact over a majority of their respective widths. The compression of the seal also forces its side lobes into the channels 45 on either side of the ridge 42. The walls 43 of the recesses prevent the seal from being extruded or forced axially by fuel pressure.

The outer radial periphery 52 of the seal has a curved convex transverse cross-section as shown in FIG. 6, except over the region of contact where it is flattened against the socket 31. In its uncompressed state as shown in FIG. 8, the outer radial periphery 52 of the seal sectional seal has a substantially constant radius of curvature so that it has a convex partially toroidal profile like a conventional O-ring.

The seal has a plane of symmetry 53 in both its installed (compressed) state as in FIG. 6 and its uninstalled (uncompressed) state as in FIG. 8. The plane of symmetry 53 bisects the groove 51 and the ridge 42.

The conductive seal design has a unique shape to fool proof the installation, such that a standard non-conductive seal cannot be installed. Typical standard seal shape designs are O-ring, D-seal and T-seal. The groove or scallop 51 in the inner radial periphery of the conductive seal fits onto the raised ridge or baulk feature 42 on the corresponding seal housing.

Figure 9:
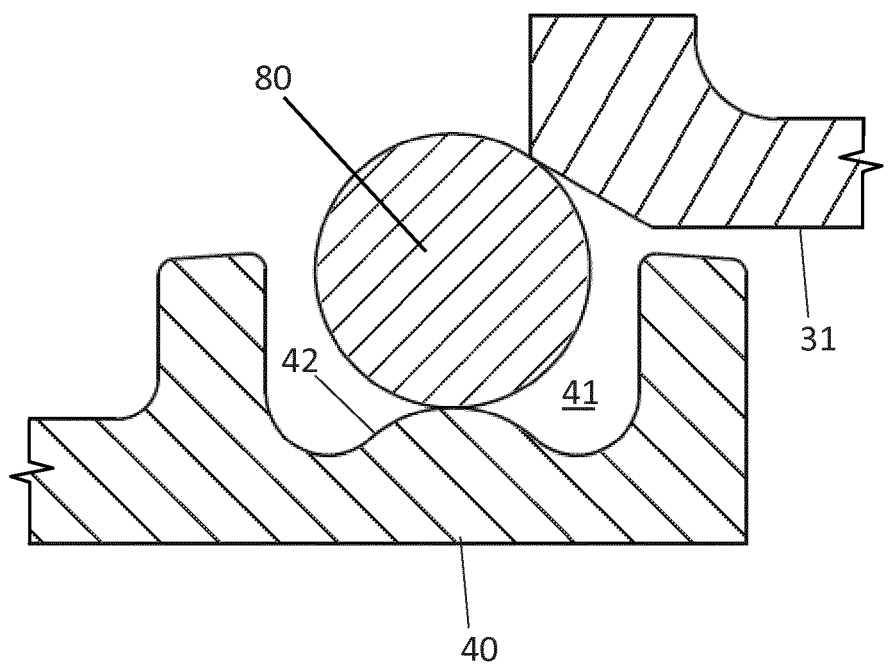
FIG. 9 shows a conventional O-ring seal being attempted to be used in the pipe joint.

The ridge or baulk feature 42 is specifically designed to prevent mal-installation of a standard and equivalently-sized non-conductive O-ring seal as shown in FIG. 9. FIG. 9 shows a non-conductive O-ring seal 80 fitted into the annular recess 41. The mismatch between the ridge 42 and the convex inner radial periphery of the O-ring causes the O-ring to protrude out of the annular recess 41 to the extent that it cannot compress sufficiently when an attempt is made to push the pipes together. This alerts the installer to replace it with the correct electrically conductive seal.

Another advantage of the non-circular cross-section of the seal 50 is that it makes the seal more resistant to twisting so it is less prone to spiral failure than an O-ring with a circular cross-section.

Figure 10:
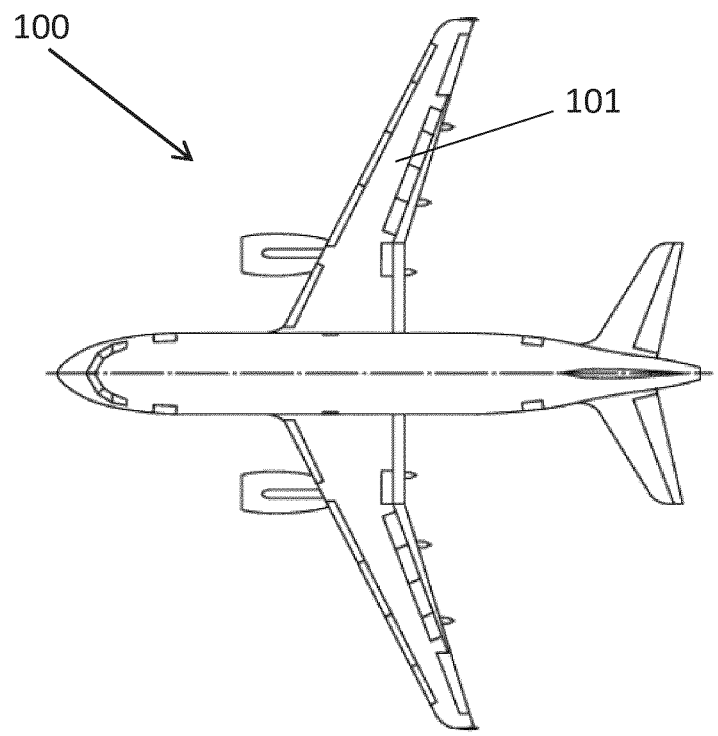
FIG. 10 shows an aircraft incorporating the joint of FIG. 1.

An aircraft 100 comprising the fuel pipe joint of FIG. 1 is shown in FIG. 10. The aircraft has wings 101 containing fuel tanks, and the fuel pipe joint may be located in one of the wing fuel tanks, or in another part of the aircraft fuel system.

The use of electrical bonding leads significantly increases weight, cost and installation time, and is a frequent cause of in-service issues due to corrosion and damage. The joint 1 has no electrical bonding tags or leads on the first or second pipe as the electrical bonding path is provided through the conductive seal 50. The conductive seal will conduct any electro-static charge which accumulates on the pipework, from the pipe to the socket and safely back to structure of the aircraft.

Figure 11:
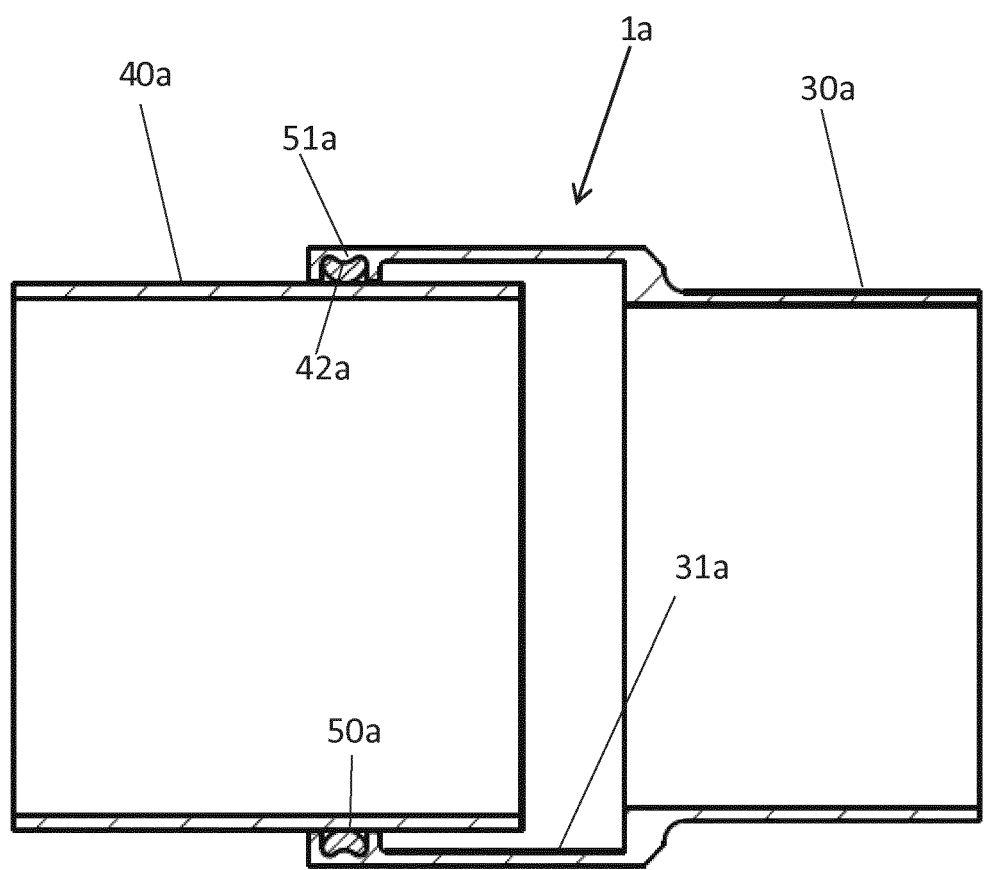
FIG. 11 is a cross-sectional view of an alternative joint in which the seal is housed in the socket.

A pipe joint 1a shown in FIG. 11 comprises a first pipe 30a with an enlarged end providing a socket 31a; a second pipe 40a fitted into the socket 31a; and an annular seal 50a compressed between the socket and the pipe. The pipe joint 1a is similar to the pipe joint 1 of FIG. 1, and equivalent features are given the same reference number appended by the letter "a".

In the pipe joint 1 the pipe 40 has a ridge 42 which extends around an outer radial periphery of the pipe 40, and a groove 51 which extends around an inner radial periphery of the seal 50. In the pipe joint 1a the socket 31a has a ridge 42a which extends around an inner radial periphery of the socket, and a groove 51a which extends around an outer radial periphery of the seal 50a. So in this case the socket 31a (the female part of the joint) has the recess which houses the seal, rather than the pipe 40a (the male part of the joint).

The arrangement of FIG. 1 (with the seal fitted to the pipe 40 rather than the socket 31) is preferred for a number of reasons. The seal 50 is stretched circumferentially to fit over the flange, and remains slightly stretched circumferentially after it has become seated in the recess as shown in FIG. 8. This provides a positive engagement making the seal 50 less likely to be forced out of the recess. Also, the seal 50 is more visible than the seal 50a, making it easier to visually check that it is properly seated in the recess. If the seal 50a is not properly seated, then it may be damaged or forced out of the recess by the pipe 40a as the joint is assembled.

FIGS. 12-17 are cross-sectional views of seals 150, 250, 350, 450, 550, 650 according to further embodiments of the invention. The seals shown in FIG. 12-17 are made of the same material as the seal 50 described above—an elastomeric material mixed with a particulate fill material (such as carbon or metal) with a higher electrical conductivity.

Figure 12:
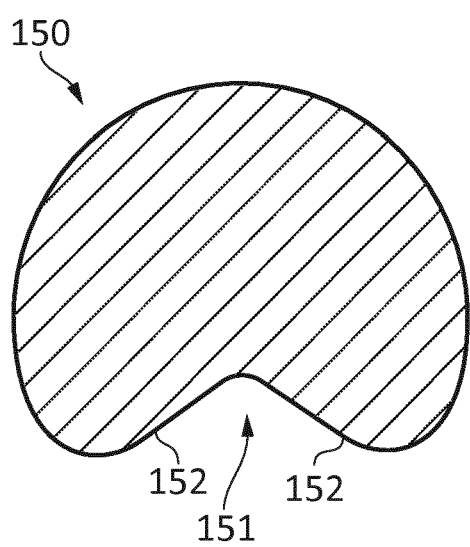
FIG. 12 is a cross-sectional view of a seal with a planar groove.

The seal 150 in FIG. 12 has a groove or scallop 151 which extends around an inner radial periphery of the seal. The groove 51 in the seal 50 is continuously curved, whereas the groove 151 in the seal 150 has angled planar side walls 152.

Figure 13:
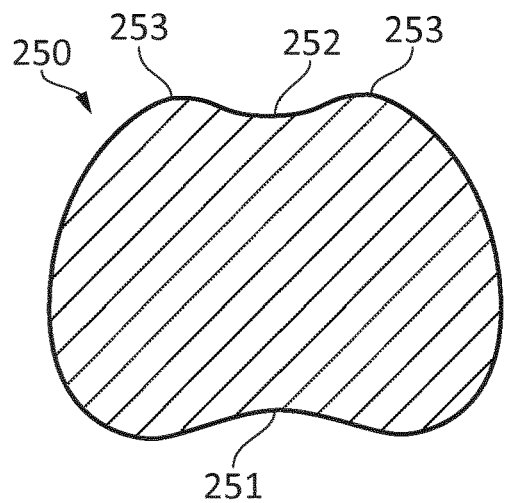
FIG. 13 is a cross-sectional view of a seal with two grooves.

The seal 250 in FIG. 13 has a groove or scallop 251 which extends around an inner radial periphery of the seal, and a groove or scallop 252 which extends around an outer radial periphery of the seal. A pair of lobes 253 extend around the outer radial periphery of the seal on either side of the groove 252, opposite the groove 251.

Figure 14:
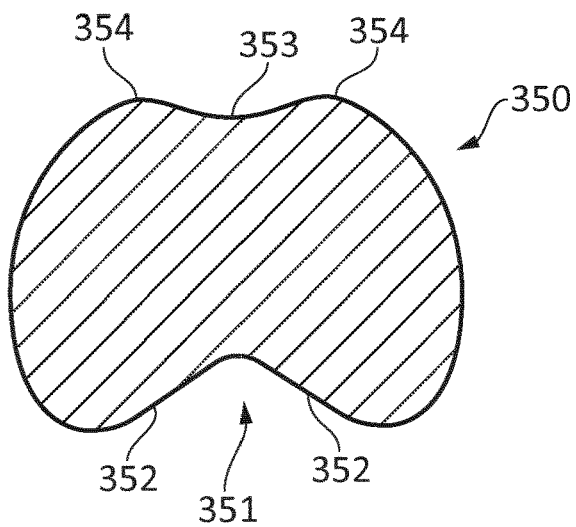
FIG. 14 is a cross-sectional view of another seal with two grooves.

The seal 350 in FIG. 14 has a groove or scallop 351 which extends around an inner radial periphery of the seal, and a groove or scallop 353 which extends around an outer radial periphery of the seal. A pair of lobes 354 extend around the outer radial periphery of the seal on either side of the groove 353, opposite the groove 351. The groove 351 has angled planar side walls 352.

Figure 15:
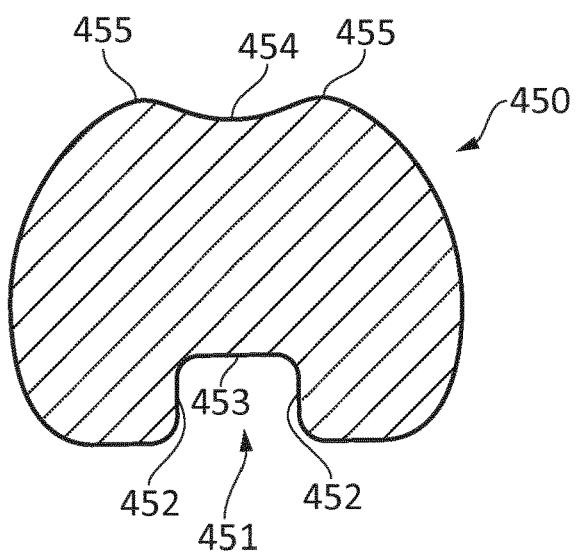
FIG. 15 is a cross-sectional view of another seal with two grooves.

The seal 450 in FIG. 15 has a groove or scallop 451 which extends around an inner radial periphery of the seal, and a groove or scallop 454 which extends around an outer radial periphery of the seal. A pair of lobes 455 extend around the outer radial periphery of the seal on either side of the groove 454, opposite the groove 451. The groove 451 has planar vertical side walls 452 and a planar horizontal base 453.

Figure 16:
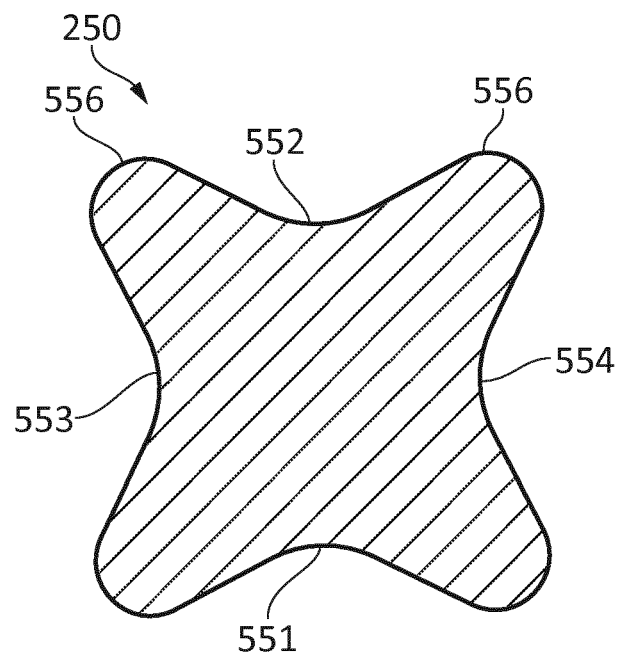
FIG. 16 is a cross-sectional view of a seal with an X-shape.

The seal 550 in FIG. 16 has an X-shaped profile with a groove or scallop 551 which extends around an inner radial periphery of the seal, a groove or scallop 552 which extends around an outer radial periphery of the seal, a first groove or scallop 553 which extends around a left-hand axial periphery of the seal, and a second groove or scallop 554 which extends around a right-hand axial periphery of the seal. A pair of lobes 556 extend around the outer radial periphery of the seal on either side of the groove 552, opposite the groove 551.

Such an X-shaped profile can provide an improved sealing performance because pressure acting on the first groove 553 or the second groove 554 tends to bring the lobes 556 together which improves the performance of the seal 550.

Figure 17:
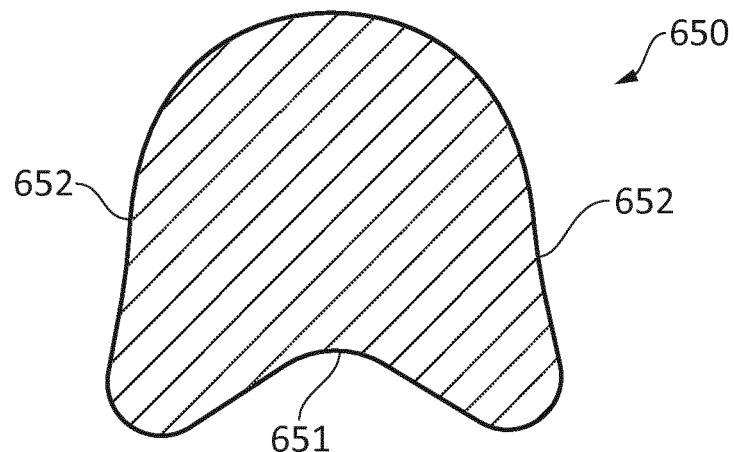
FIG. 17 is cross-sectional view of a seal with planar sides.

The seal 650 in FIG. 17 has a groove 651 which extends around an inner radial periphery of the seal, and planar axial side walls 652. The seal 650 has an increased radial thickness compared with some of the other seals, given a higher compression ratio.

Figure 18:
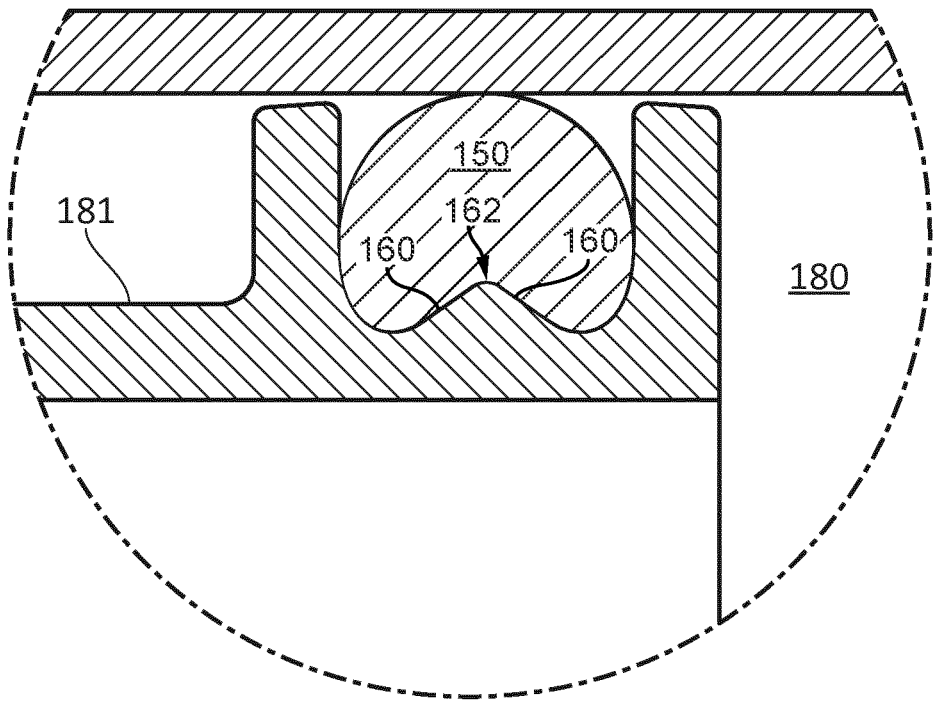
FIG. 18 shows a pipe joint incorporating the seal of FIG. 12.

FIG. 18 shows a pipe joint comprising a socket 180; a pipe 181 fitted into the socket; and the seal 150 of FIG. 12 compressed between the socket and the pipe. The pipe has a recess which houses the seal 150. The recess has a ridge 162 in a base of the recess which fits into the groove 151 of the seal 150. The ridge 162 has angled planar side walls 160 which engage the angled planar side walls 152 of the groove 151.

Figure 19:
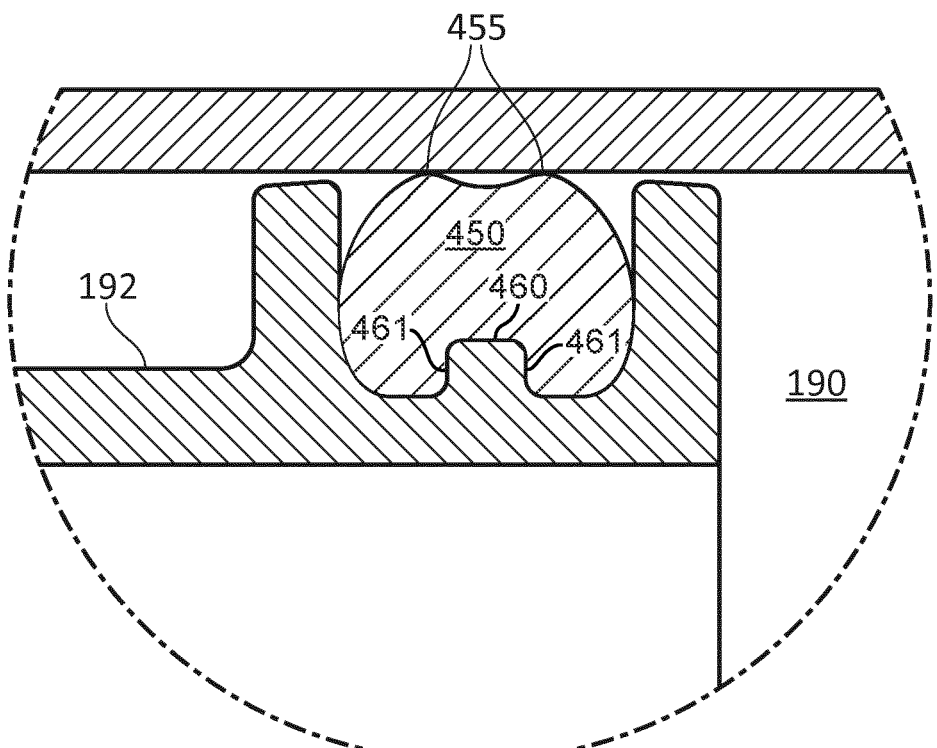
FIG. 19 shows a pipe joint incorporating the seal of FIG. 15.

FIG. 19 shows a pipe joint comprising a socket 190; a pipe 191 fitted into the socket; and the seal 450 of FIG. 15 compressed between the socket and the pipe. The pipe has a recess which houses the seal 450. The recess has a ridge 460 in a base of the recess which fits into the groove 451 of the seal 450. The ridge 162 has planar walls which engage the planar vertical side walls 452 and base 453 of the groove 451.

The socket 190 does not have a ridge which fits into the groove 454 in the outer radial periphery of the seal. As a consequence the two lobes 455 contact the socket at two separate contact regions, with no contact between the regions. The separate (i.e. non-contiguous) contact regions provide an improved sealing performance.

The planar vertical side walls 461 of the ridge 460 engage the planar vertical side walls 452 of the seal 450. The walls 452, 461 extend at right angles to the axis of the pipe joint, which impedes the seal 450 being pushed sideways by axial forces.

The seals 250, 350, 550, 650 can be integrated into a pipe joint in a similar fashion, with a ridge fitting into the groove 251, 351, 551, 651 in the inner radial periphery of the seal. The seals 250, 350, 550 have respective lobes 253, 354, 556 contact the socket at two separate contact regions as shown in FIG. 19 with no contact between the regions.

In the pipe joint 1 or 1a described above, the pipes are single-walled with one of the pipes providing the socket which acts as the female part of the joint and the other providing the male part of the joint. In a further embodiment of the invention, the pipe joint may be a double-walled pipe joint as described in FIG. 2 of WO2007/057629, for example. In this case, one of the pipes carries inner and outer annular seals, with the inner seal housed in a recess on an inner radial periphery of the pipe and the outer seal housed in a recess on an outer radial periphery of the pipe. One or both of these annular seals may have a groove receiving a ridge in the base of its respective recess.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:
1. A pipe joint comprising:
a socket;
a pipe fitted into the socket; and
a seal compressed between the socket and the pipe, wherein the seal is electrically conductive and resiliently flexible, the socket or the pipe has a recess which houses the seal, the recess has a ridge in a base of the recess, the seal has a groove which extends around a radial periphery of the seal, the ridge fits into the groove, the seal comprises a seal material mixed with a fill material, wherein the fill material has a higher electrical conductivity than the seal material and the fill material is a particulate fill material.

2. The pipe joint according to claim 1, wherein the pipe has the recess and the groove extends around an inner radial periphery of the seal.

3. The pipe joint according to claim 1, wherein the socket has the recess and the groove extends around an outer radial periphery of the seal.

4. The pipe joint according to claim 1, wherein the recess comprises a pair of side walls; and the base of the recess has a pair of channels between the ridge and the side walls.

5. The pipe joint according to claim 1, wherein the groove has a transverse cross-section which is curved over a majority of a width of the groove.

6. The pipe joint according to claim 5, wherein the transverse cross-section of the groove has a substantially constant radius of curvature over a majority of a width of the groove.

7. The pipe joint according to claim 1, wherein the ridge and the groove have complementary shapes so that they are in contact over a majority of their respective widths.

8. The pipe joint according to claim 1, wherein the ridge and the groove have complementary partially-toroidal shapes.

9. The pipe joint according to claim 1, wherein the seal provides a conductive path between the socket and the pipe with an electrical resistance which is less than 3 M Ohm.

10. The pipe joint according to claim 1, wherein the pipe is a fuel pipe.

11. The pipe joint according to claim 1, wherein the seal is compressed between the socket and the pipe with a compression ratio greater than 10%.

12. The pipe joint according to claim 1, wherein the seal has a plane of symmetry which bisects the groove.

13. The pipe joint according to claim 1, wherein the seal provides a conductive path between the socket and the pipe with an electrical resistance which is greater than 1 Ohm.

14. The pipe joint according to claim 1, wherein the seal has a pair of lobes which extend around a radial periphery of the seal opposite the groove, and the lobes contact the pipe or the socket at two separate contact regions.

15. Pipe joint according to claim 1, wherein the seal material is an elastomeric or thermoplastic material.

16. Pipe joint according to claim 1, wherein the seal material is an elastomeric material.

17. An aircraft comprising a pipe joint according to claim 1.

18. A pipe joint comprising:
a socket;
a pipe fitted into the socket; and
a seal compressed between the socket and the pipe, wherein the seal is electrically conductive and resiliently flexible, the socket or the pipe has a recess which houses the seal, the recess has a ridge in a base of the recess, the seal has a groove which extends around a radial periphery of the seal, the ridge fits into the groove, the seal has a pair of lobes which extend around a radial periphery of the seal opposite the groove, and the lobes contact the pipe or the socket at two separate contact regions.

19. A pipe joint comprising:
a socket;
a pipe fitted into the socket;
a seal compressed between the socket and the pipe, wherein the seal is electrically conductive and resiliently flexible, and
a recess in the socket or pipe configured to house the seal, and the recess has a ridge in a base of the recess,
wherein the seal has a groove which extends around a radial periphery of the seal, the ridge of the recess fits into the groove, and
wherein the seal comprises a seal material mixed with a fill material, and the fill material has a higher electrical conductivity than the seal material and the seal material is an elastomeric or thermoplastic material.

* * * * *